US012625682B2

(12) United States Patent
Escala et al.

(10) Patent No.: US 12,625,682 B2
(45) Date of Patent: May 12, 2026

(54) METHODS AND SYSTEMS FOR AUTOMATED GENERATION OF A USER INTERFACE

(71) Applicant: Lemon Inc., Grand Cayman (KY)

(72) Inventors: Diego Escala, Los Angeles, CA (US); Priyeshkumar Wani, Los Angeles, CA (US); James Gualtieri, Los Angeles, CA (US)

(73) Assignee: Lemon Inc., Grand Cayman (KY)

( * ) Notice: Subject to any disclaimer, the term of this patent is extended or adjusted under 35 U.S.C. 154(b) by 151 days.

(21) Appl. No.: 18/341,014

(22) Filed: Jun. 26, 2023

(65) Prior Publication Data

US 2024/0427572 A1 Dec. 26, 2024

(51) Int. Cl.
*G06F 8/38* (2018.01)
*G06F 9/451* (2018.01)

(52) U.S. Cl.
CPC .............. *G06F 8/38* (2013.01); *G06F 9/451* (2018.02)

(58) Field of Classification Search
CPC .................................... G06F 8/38; G06F 9/451
See application file for complete search history.

(56) References Cited

U.S. PATENT DOCUMENTS

| | | | | | |
|---|---|---|---|---|---|
| 7,234,115 | B1 * | 6/2007 | Sprauve | .................. | H04L 12/66 |
| | | | | | 715/744 |
| 7,404,177 | B1 * | 7/2008 | Greenfield | ................ | G06F 8/70 |
| | | | | | 717/106 |

| | | | | | |
|---|---|---|---|---|---|
| 2004/0113941 | A1 * | 6/2004 | Sliwa | ...................... | G06F 9/451 |
| | | | | | 715/744 |
| 2006/0288301 | A1 * | 12/2006 | Hood | ..................... | G06F 9/451 |
| | | | | | 715/744 |
| 2007/0061740 | A1 * | 3/2007 | Marini | ..................... | G06F 8/38 |
| | | | | | 707/999.1 |
| 2010/0023547 | A1 | 1/2010 | Brid | | |

(Continued)

FOREIGN PATENT DOCUMENTS

| | | | | | |
|---|---|---|---|---|---|
| CN | 104969187 | A | * | 10/2015 | ............. G06F 3/048 |
| CN | 108027720 | A | * | 5/2018 | ........... G06F 3/0484 |

(Continued)

OTHER PUBLICATIONS

International Search Report in International Appln. No. PCT/SG2024/050370, mailed on Aug. 18, 2024, 3 pages.

*Primary Examiner* — Phillip H Nguyen
(74) *Attorney, Agent, or Firm* — Fish & Richardson P.C.

(57) ABSTRACT

A method and system for automated generation of a user interface that includes one or more components for one or more entities in an entity component system. The method includes receiving one or more data objects for one or more component properties of the one or more components for the user interface; storing the one or more data objects for the one or more component properties in storage; and accessing the one or more data objects from the storage and determining property fields for the user interface corresponding to the one or more data objects using a property fields provider module. The method further includes generating the user interface comprising the one or more components, in an automated manner, based on the property fields corresponding to the one or more data objects.

20 Claims, 6 Drawing Sheets

(56) References Cited

U.S. PATENT DOCUMENTS

| | | | |
|---|---|---|---|
| 2010/0138778 A1 * | 6/2010 | Dewan | G06F 9/451 |
| | | | 715/789 |
| 2011/0214076 A1 * | 9/2011 | Cui | G06F 8/38 |
| | | | 715/762 |
| 2012/0311471 A1 * | 12/2012 | Bullard | G06F 3/048 |
| | | | 715/764 |
| 2013/0339421 A1 * | 12/2013 | Dawson | A63F 13/60 |
| | | | 709/203 |
| 2015/0248216 A1 | 9/2015 | Li et al. | |
| 2016/0261550 A1 * | 9/2016 | Chang | G06Q 10/107 |
| 2017/0270418 A1 * | 9/2017 | Reschke | G06F 3/04847 |
| 2021/0103380 A1 * | 4/2021 | Saw | G06F 8/20 |
| 2021/0344739 A1 * | 11/2021 | Kalva | H04L 67/02 |
| 2021/0405825 A1 * | 12/2021 | Narayanan | G06F 9/451 |
| 2022/0236965 A1 * | 7/2022 | Rahill-Marier | G06F 9/451 |
| 2023/0083813 A1 | 3/2023 | Soon-Shiong | |

FOREIGN PATENT DOCUMENTS

| | | | | |
|---|---|---|---|---|
| CN | 114849240 A | 8/2022 | | |
| KR | 20090111351 A | * 10/2009 | | G06F 16/2428 |
| WO | WO-2006124487 A2 | * 11/2006 | | G06F 9/451 |
| WO | WO-2024196419 A1 | * 9/2024 | | |

* cited by examiner

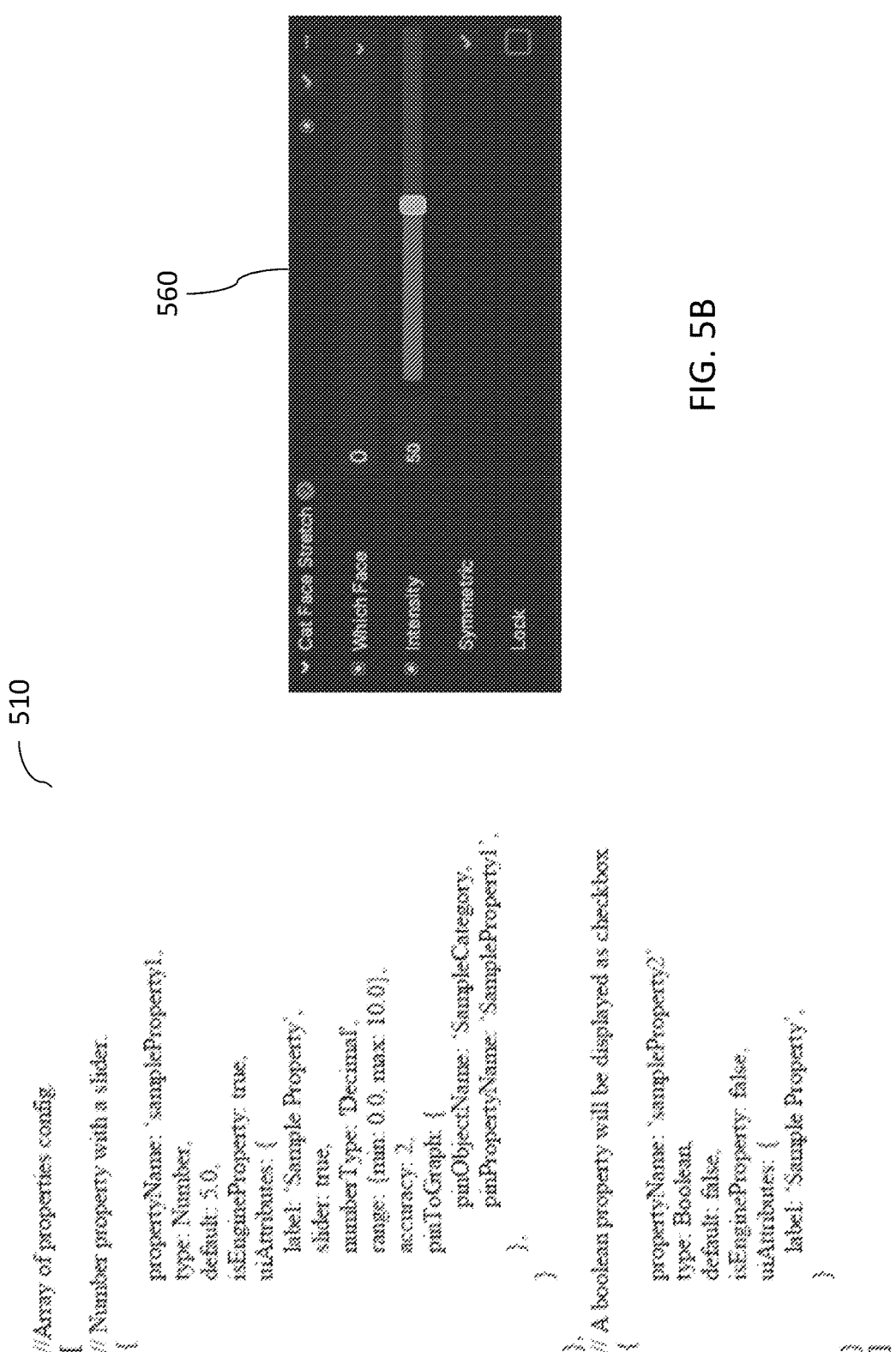

510

560

```
//Array of properties config.
[
// Number property with a slider.
{
    propertyName: 'sampleProperty1',
    type: Number,
    default: 50,
    isEngineProperty: true,
    uiAttributes: {
        label: 'Sample Property',
        slider: true,
        numberType: Decimal,
        range: {min: 0.0, max: 10.0},
        accuracy: 2,
        pinToGraph: {
            pinObjectName: 'SampleCategory',
            pinPropertyName: 'SampleProperty1'
        }
    },
},
// A boolean property will be displayed as checkbox
{
    propertyName: 'sampleProperty2',
    type: Boolean,
    default: false,
    isEngineProperty: false,
    uiAttributes: {
        label: 'Sample Property',
    },
}
]
```

METHODS AND SYSTEMS FOR AUTOMATED GENERATION OF A USER INTERFACE

FIELD

The embodiments described herein pertain generally to creating user interfaces for an entity component system and component property management. More specifically, the embodiments described herein pertain to methods and systems for automated generation of a user interface or portion thereof such that developers or creators may add, change, or remove one or more entities and/or components in the entity component system and component property management of the added, changed, or removed entities and/or components.

BACKGROUND

An entity component system or architecture (referred to herein as "entity component system") may be used in many applications including, but not limited to effects engines or gaming engines for the generation of a virtual reality, augmented reality, and/or gaming environment. The entity component system may include entities that may represent players, characters, buildings, or anything else that may be part of the game, simulation, or augmentation. Each entity may include one or more components that may include properties that modify the behavior of the entity, e.g., an effect that may define or characterize the entity as possessing a particular aspect(s). The behavior of the entity may be changed, for example, by adding or removing components. In order to configure and/or customize the properties of the entities and/or components, code associated with the configuring and/or customizing of the properties needs to be developed for rendering the user interface for use by the user of the application, effects engine, or gaming engine, which may be tedious, repetitive, and error-prone. Moreover, since the code must be developed, the developers or creators of the new entities or components for the entity component system must have coding knowledge, and particularly, front-end coding knowledge so that the user interface has the appropriate appearance to display the component and component properties, allow their editing, and also maintain the state of user controls for usability by the user of the application, effects engine, or gaming engine.

SUMMARY

Features in the embodiments disclosed herein may provide for the automated generation of the user interface or portion thereof having one or more components and/or property update mechanisms for one or more components, such that the adding, changing, or removal of a component or entity in the entity component system is made easier and less error-prone, e.g., less coding errors and in which no knowledge of front-end development coding is necessary. For example, in an embodiment, the developer or creator of the entity or component does not have to: develop the code to render the user interface or portion thereof and controls for interacting with the component, develop the code for storing and retrieving component properties, or develop the code for sending component property updates. Rather, the developer or creator creates or inputs pure-data representations of the component properties and may register the data-based representation of the component with a component registry. The data-based representation of the component may then be translated, e.g., by a property fields provider module, to determine the property fields for generating the user interface or portion thereof having the components. As such, the embodiments disclosed herein provide for the automated generation of the user interface that a user of the application, effects engine, or gaming engine may use for interacting with the new component or entity, e.g., user interface or portion thereof for modifying or interacting with the component to provide interactive effects in the application, effects engine, or gaming engine. Furthermore, the embodiments disclosed herein provide for the handling of the storage, retrieval, and propagation of component property updates to one or more of the property fields provider module, applications, effects engines, or gaming engines.

In one example embodiment, a method for automated generation of a user interface that includes one or more component for one or more entities in an entity component system is provided. The method includes receiving one or more data objects for one or more component properties of the one or more components for the user interface; storing the one or more data objects for the one or more component properties in storage; and accessing the one or more data objects from the storage and determining property fields for the user interface corresponding to the one or more data objects using a property fields provider module. The method further includes generating the user interface comprising the one or more components, in an automated manner, based on the property fields corresponding to the one or more data objects.

In an example embodiment, the determining of the property fields for the user interface includes translating the one or more data objects for the one or more components into the property fields for rendering the user interface.

In another example embodiment, the storage is a component registry, and the storing of the one or more data objects for the one or more component properties includes registering the one or more data objects for the one or more component properties with the component registry.

In another example embodiment, the storing of the one or more data objects for the one or more component properties includes accessing the one or more data objects for the one or more component properties through an accessor module.

In another example embodiment, the method further includes creating interactive effects for the one or more entities in the entity component system using the one or more components.

In yet another example embodiment, a system for automated generation of a user interface having one or more components for one or more entities in an entity component system is provided. The system includes a component module configured to receive one or more data objects for one or more component properties of the one or more components of the user interface and a component registry module configured to receive and/or provide the one or more data objects for the one or more component properties. The system further includes a property fields provider module configured to access the component registry module and determine property fields for the user interface corresponding to the one or more data objects, and a rendering module configured to generate the user interface having the one or more components, in an automated manner, based on the property fields corresponding to the one or more data objects.

BRIEF DESCRIPTION OF THE DRAWINGS

The accompanying drawings illustrate various embodiments of systems, methods, and embodiments of various other aspects of the disclosure. Any person with ordinary skills in the art will appreciate that the illustrated element boundaries (e.g. boxes, groups of boxes, or other shapes) in the figures represent one example of the boundaries. It may be that in some examples one element may be designed as multiple elements or that multiple elements may be designed as one element. In some examples, an element shown as an internal component of one element may be implemented as an external component in another, and vice versa. Non-limiting and non-exhaustive descriptions are described with reference to the following drawings. The components in the figures are not necessarily to scale, emphasis instead being placed upon illustrating principles. In the detailed description that follows, embodiments are described as illustrations only since various changes and modifications may become apparent to those skilled in the art from the following detailed description.

FIG. 5A is an example of data objects used to add a component and FIG. 5B is an example user interface generated by a system architecture or processing flow for automated generation of the user interface, in accordance with at least some embodiment described herein.

DETAILED DESCRIPTION

Figure 1:
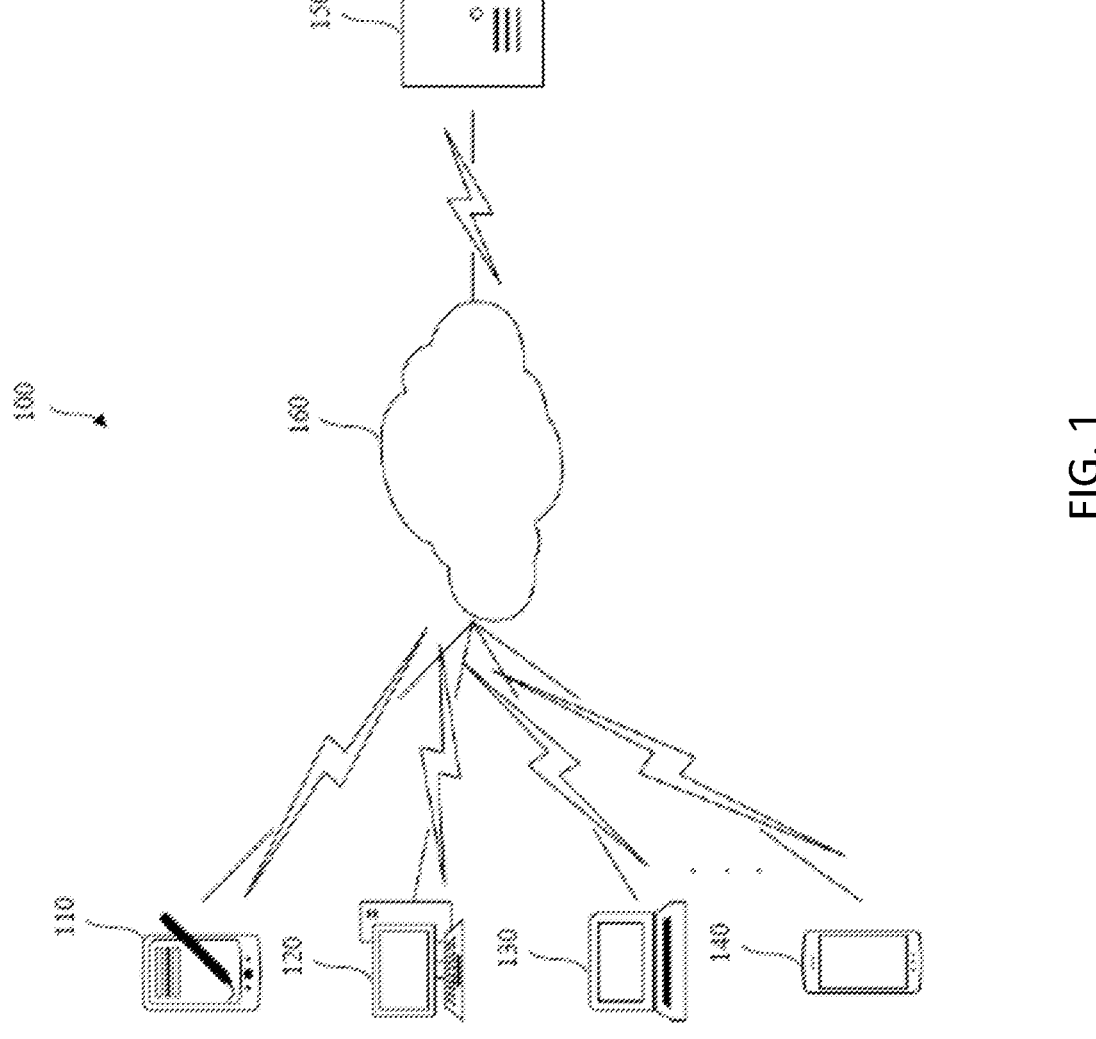
FIG. 1 is a schematic view of an example system for automated generation of a user interface and component dissemination, arranged in accordance with at least some embodiments described herein.

In the following detailed description, particular embodiments of the present disclosure are described herein with reference to the accompanying drawings, which form a part of the description. In this description, as well as in the drawings, like-referenced numbers represent elements that may perform the same, similar, or equivalent functions, unless context dictates otherwise. Furthermore, unless otherwise noted, the description of each successive drawing may reference features from one or more of the previous drawings to provide clearer context and a more substantive explanation of the current example embodiment. Still, the example embodiments described in the detailed description, drawings, and claims are not intended to be limiting. Other embodiments may be utilized, and other changes may be made, without departing from the spirit or scope of the subject matter presented herein. It will be readily understood that the aspects of the present disclosure, as generally described herein and illustrated in the drawings, may be arranged, substituted, combined, separated, and designed in a wide variety of different configurations, all of which are explicitly contemplated herein.

It is to be understood that the disclosed embodiments are merely examples of the disclosure, which may be embodied in various forms. Well-known functions or constructions are not described in detail to avoid obscuring the present disclosure in unnecessary detail. Therefore, specific structural and functional details disclosed herein are not to be interpreted as limiting, but merely as a basis for the claims and as a representative basis for teaching one skilled in the art to variously employ the present disclosure in virtually any appropriately detailed structure.

Additionally, the present disclosure may be described herein in terms of functional block components and various processing steps or modules. It should be appreciated that such functional blocks or modules may be realized by any number of hardware and/or software components configured to perform the specified functions, for example, when executed by a processor-enabled computing device.

The scope of the disclosure should be determined by the appended claims and their legal equivalents, rather than by the examples given herein. For example, the steps recited in any method claims may be executed in any order and are not limited to the order presented in the claims. Moreover, no element is essential to the practice of the disclosure unless specifically described herein as "critical" or "essential".

As referenced herein, an "entity component system" is an architectural pattern or paradigm that may be used in the development in various platforms, for example, including, but not limited to, social media applications, virtual reality applications, augmented reality applications, and effects or gaming engines. The entity component system may include one or more entities, one or more components, and one or more systems.

As referenced herein, an "entity" is a term of art and may refer to a general-purpose object, including, but not limited to, players, characters, buildings, or anything else that may be part of the game, simulation, or augmentation. The entity may include one or more components for defining or characterizing the entity.

As referenced herein, a "component" is a term of art and may refer to components and their respective properties that modify the behavior of the entity, e.g., an effect that may define or characterize the entity as possessing a particular aspect(s). It is to be understood that a component may include one or more properties. In some embodiments, the component may include data for modeling the aspect and may include data corresponding to one or more systems. In some embodiments, the data may include one or more of structures, classes, or associative arrays. In an example embodiment, the component may include a renderer component that may contain data relating to a three-dimensional (3D) model property that may define the 3D shape and appearance of the entity, such that the object may be rendered. Other components may include, but not limited to, collider components for interaction of the component with other objects, physics components for defining properties according to the laws of physics, etc.

As referenced herein, a "property field" may refer to data that represents a user interface control for a data type. For example, in an embodiment, the property field for a numeric type may be rendered as a number box, featuring the input validation and user controls associated with the input, editing, and range checking. In another embodiment, a property field for a 3-component vector may contain three number boxes, one for each component of the vector. The property field may also represent data for buttons, widgets, sliders, or other user interface controls.

As referenced herein, a "system" in the entity component system is a term of art and may refer to a process or system that acts on the components of various entities to result in the logic of the game, desired augmentations, or virtual reality generation in the entity component system. In an example embodiment, the ECS system may include, but not limited to, a rendering system that is configured to iterate over all renderer components such that any corresponding 3D models may be rendered in the correct positions, e.g., on the mapping or determined locations, a physics system that is configured to iterate over all components that provide physical definitions such that objects may move according to the laws of physics, detect collisions between objects, and cause objects to physically respond to those collisions in a realistic manner, or the like.

As referenced herein, "automated" or "automating" may refer to a process in which a system is configured to automatically translate one or more data objects for the one or more components of the user interface or portion thereof into property fields to generate the user interface, in which the necessary code to manipulate or change the user interface or portion thereof is provided by the system, e.g., to auto-generate the user interface based on the one or more data objects. That is, a developer or creator of any new components for the user interface may not need to provide the code for generating the user interface or portion thereof at the front-end, but rather, only has to enter the data objects, e.g., the developer or creator does not need to have front end programming knowledge. For example, the system provides the code, e.g., via a translation layer, corresponding to the property fields related to the data objects to generate, manipulate, or change the user interface or portion thereof including, but not limited to, space adjustments, formatting, pixel placement, re-arrangement of existing components, providing sliders, buttons, or input areas for adjusting or providing values, etc.

As referenced herein, "Effect House" is a system architecture that is configured to provide an interface between the developers and creators and one or more of the social media application, virtual reality application, augmented reality application, and effects or gaming engine. In an example embodiment, the Effect House is configured in a way such that developer or creator can add, change or remove existing components, and/or configure one or more entities and/or one or more components for creating effects for the entities.

As referenced herein, a "module" may refer to a network, algorithm, programs, hardware, or any combination thereof configured or otherwise provided to perform the recited function.

Features in the embodiments disclosed herein may provide for the automated generation of the user interface or portion thereof having one or more components and/or property update mechanisms for one or more components, such that the adding, changing or removal, of a component or entity on the user interface for modifying or rendering the entity component system is made easier and less error-prone, e.g., less coding errors and in which no knowledge of front-end development coding is necessary. For example, in an embodiment, the developer or creator of the entity or component does not have to: develop the code to render the user interface and controls for interacting with the component, develop the code for storing and retrieving component properties, or develop the code for sending component property updates. Rather, the developer or creator creates or inputs pure-data representations of the component properties and may register the data-based representation of the component with a component registry. The system may include a property fields provider module that is configured to determine property fields for the user interface corresponding to the data objects, and a rendering module that is configured to generate the user interface or portion thereof.

As such, the embodiments disclosed herein provide for the automated generation of the user interface or portion thereof that a user of the application, effects engine, or gaming engine may use for interacting with the new component or entity, e.g., user interface for modifying or interacting with the entity used in the application, effects engine, or gaming engine. Furthermore, the embodiments disclosed herein provide for the handling of the storage, retrieval, and propagation of component property updates by one or more of the property fields provider module, applications, effects engines, or gaming engines.

As discussed above, an entity component system is an architectural paradigm that may be used in social media applications, virtual reality applications, augmented reality applications, and effects or gaming engines, in which the entity component system may use compositions, rather than inheritance trees. In an embodiment, the entity component system may include, but not limited to, entities, components, and systems for generating the game, simulation, or augmentation for the user. In an embodiment, the entity may represent game objects, such as, players, characters, buildings, or anything else that may be part of the game or simulation. The entities may include components that may be comprised of properties to modify, define, and/or characterize one or more behaviors of the entity(ies), e.g., an effect that may define or characterize the entity as possessing a particular aspect(s). For example, a renderer component may contain a 3D model property defining the 3D shape and appearance of the entity, thus enabling the entity to be rendered.

In the entity component system, the system acts on the components of various entities to result in the logic of the game, desired augmentations, or virtual reality generation. In an example embodiment, the system may include, but not limited to, a rendering system that is configured to iterate over all renderer components such that any corresponding 3D models may be rendered in the correct positions, e.g., on the mapping or determined locations, a physics system that is configured to iterate over all components that provide physical definitions such that objects may move according to the laws of physics, detect collisions between objects, and cause objects to physically respond to those collisions in a realistic manner, etc.

In some embodiments of the entity component system, any game object can be created by adding the correct components to an entity and/or modified by changing the components of the entity, such that a developer or creator may be able to create effects, e.g., by modifying the components, for modifying the behavior of an entity in the entity component system for the one or more of the social media application, virtual reality application, augmented reality application, and effects or gaming engine, for example, via a system architecture, such as, the Effect House, which may be an interface between the developers and creators and the underlying effects or gaming engine. For example, the developer or creator may be able to use the Effect House to configure entities and components by adding, removing, and/or modifying the entities and components and to customize the properties of the components that have been added for each entity via a processor-enabled device. In some embodiments, to facilitate the use of the Effect House, a user interface may be provided for a user of the application, effects engine, or gaming engine, e.g., end user, to control and/or modify values for the one or more entities and components.

However, developing the code for rendering the user interface is tedious, repetitive, and error prone. For example, each time a new component is added to the entity component system, a corresponding user interface must be painstakingly hand-coded anew at the front-end, including, but not limited to, the position, rotation, scale, font, style, type of control, e.g., slider, Boolean, geometric axes (XYZ), or the like. Additionally, since different developers or creators may use different coding patterns or have different coding styles, the coding of the user interface may be inconsistent. Moreover, the new component must be communicated to the respective social media application, virtual reality application, augmented reality application, or effects or gaming engines such that the component is available to the user for using the component and/or the entity in the entity component system.

As such, the embodiments discussed herein are directed to overcoming one or more of the deficiencies as discussed above. In an example embodiment, given the repetitive nature of the user interface implementation process, e.g., modification of the component(s) of the entity(ies), as well as the many tasks that must be implemented for each property, e.g., behavior of the entity(ies), a method and system are provided herein for automating both the generating of the user interface and the updating of the property for a component, e.g., property management. Thus, the addition of new components to the user interface for the entity component system is made both much easier and less error-prone. That is, the rendering and/or generation of the user interface provides a user interface that not only properly displays the component properties, and allows editing and/or control of the component properties, but also properly maintains the state of the user controls, including saving and loading the properties as necessary, in which the coding may be easily reviewed and debugged to ensure quality and functionality of the user interface, e.g., the code is flexible and may be easy to modify and maintain, especially since the component processing may occur by the system architecture level and not during front-end development.

In an example embodiment, the addition (or modification or removal) of a component for the user interface may be processed by the system architecture or framework such that a developer or creator, such as, an engineer developing a new component, may not have to write the code itself, for example, the code for the controls for interacting with the components on the user interface, code for storing and retrieving component properties, or code for sending component property updates to the engine. Instead, in an embodiment, the system architecture may be configured to receive pure-data representations, e.g., one or more data objects, of the component properties from the developer or creator and the system architecture may be configured to register the data objects and component properties with a component registry, determine property fields corresponding to the data objects, e.g., component processing and/or translation, and automatically generate the new user interface for a user of the application, effects engine, or gaming engine for interacting with the new component, e.g., interactive effects for the object(s). Furthermore, the system architecture may itself, or via another module, be configured to store, retrieve, and/or propagate component property updates to modify the user interface and/or for updating the component properties for one or more entities on the one or more social media application, virtual reality application, augmented reality application, and effects or gaming engine.

The system and method having the features discussed herein may include one or more of the following benefits:

1. More rapid development of components. By automating the generation of user interfaces and loading/saving of properties, e.g., at the system framework level, new component developers or creators only need to specify data describing the component properties, obviating the need for manual definition, placement, and testing of user interface controls. This also eliminates the need for component developers or creators to write the necessary code to manage the loading, saving, and dissemination of component property updates to the application and/or effects or gaming engine. As such, developers and creators of the new component may save time by not having to write the code for the component and be able to quickly create user interfaces for dissemination to users of the application or effects or gaming engine.

2. Simplification of code defining component-related operations. The development of an ECS framework requires the implementation of various functions ancillary to the core capabilities of adding and changing entities and components. Input validation checking, undo/redo capabilities, and copy/paste functionality for components must also be provided by the software and/or system architecture in order to create a pleasant user experience, e.g., the functionalities are provided at the system architecture level instead of at front-end development.

3. Improved code stability. By automating user interface generation and component property management, the system architecture eliminates the bugs that could be introduced into the codebase if the developers or creators need to manually implement such functionality, e.g., avoids coding errors and introduction of low-performing or unstable code.

4. User interface consistency. By automating user interface generation based on the property field definition, e.g., via lookup table ("LUT") or library, it is possible to ensure that user interface controls for the same property types are generated in a uniform manner. This leads to consistency of the user interface that may be difficult to achieve if developers or creators are manually developing user interface code for interacting with the components or its properties.

5. Improved control over component rendering performance. With the uniformity afforded by this approach, component user interface rendering and property handling is done in a single place at the system architecture level, which allows optimization of these functions by improving the performance of the centralized processing. This also prevents component developers from introducing low performing or unstable code, since component processing is handled by the system framework rather than for individual components.

Example embodiments for the systems and methods for the automated generation of a user interface having one or more components are discussed further herein.

FIG. 1 is a schematic view of a network for automating a generation of a user interface and updating of a property for a component, e.g., property management, to provide interactive effects, e.g., behaviors, for one or more entities in a social media application, virtual reality application, augmented reality application, or effects or gaming engine arranged in accordance with at least some embodiments described herein.

The system 100 may include terminal devices 110, 120, 130, and 140, a network 160, and a server 150. It is to be understood that FIG. 1 only shows illustrative numbers of the terminal devices, the network, and the server. The embodiments described herein are not limited to the number of the terminal devices, the network, and/or the server described. That is, the number of terminal devices, networks, and/or servers described herein are provided for descriptive purposes only and are not intended to be limiting.

In accordance with at least some example embodiments, the terminal devices 110, 120, 130, and 140 may be various electronic devices. The various electronic devices may include but not be limited to a mobile device such as a smartphone, a tablet computer, an e-book reader, a laptop computer, a desktop computer, and/or any other suitable electronic devices. The terminal devices 110, 120, 130, and 140 may include the application, effects engine, or gaming engine for generating a virtual reality, augmented reality, and/or gaming environment. The terminal devices 110, 120, 130, and 140 may also include and/or be able to access the system architecture, such as, the Effect House, to add, remove, and/or modify at least one of components, component properties, or entities in the entity component system.

In accordance with at least some example embodiments, the network 160 may be a medium used to provide a communications link between the terminal devices 110, 120, 130, 140 and the server 150. The network 160 may be the Internet, a local area network (LAN), a wide area network (WAN), a local interconnect network (LIN), a cloud, etc. The network 160 may be implemented by various types of connections, such as a wired communications link, a wireless communications link, an optical fiber cable, etc.

In accordance with at least some example embodiments, the server 150 may be a server for providing various services to users using one or more of the terminal devices 110, 120, 130, and 140. The server 150 may be implemented by a distributed server cluster including multiple servers or may be implemented by a single server. The server 150 may include the application, effects engine, or gaming engine for generating a virtual reality, augmented reality, and/or gaming environment. The server 150 may also include the system architecture, such as, the Effect House, to add, remove, and/or modify at least one of components, component properties, or entities in the entity component system.

A user may use one or more of the terminal devices 110, 120, 130, and 140 to interact with the server 150 via the network 160. Various applications or localized interfaces thereof, such as social media applications, virtual reality applications, augmented reality applications, gaming applications, online shopping services, or the like, may be installed on the terminal devices 110, 120, 130, and 140.

It is to be understood that software applications or services according to the embodiments described herein and/or according to the services provided by the service providers may be performed by the server 150 and/or the terminal devices 110, 120, 130, and 140 (which may be referred to herein as user devices). Accordingly, the apparatus for the software applications and/or services may be arranged in the server 150 and/or in the terminal devices 110, 120, 130, and 140.

It is also to be understood that when a service is not performed remotely, the system 100 may not include the network 160, but include only the terminal device 110, 120, 130, and 140 and/or the server 150.

It is further to be understood that the terminal device 110, 120, 130, and 140 and/or the server 150 may each include one or more processors, a memory, and a storage device storing one or more programs. The terminal device 110, 120, 130, and 140 and/or the server 150 may also each include an Ethernet connector, a wireless fidelity receptor, etc. The one or more programs, when being executed by the one or more processors, may cause the one or more processors to perform the method(s) described in any embodiments described herein. Also, it is to be understood that a computer readable non-volatile medium may be provided according to the embodiments described herein. The computer readable medium stores computer programs. The computer programs are used to, when being executed by a processor, perform the method(s) described in any embodiments described herein.

Figure 2:
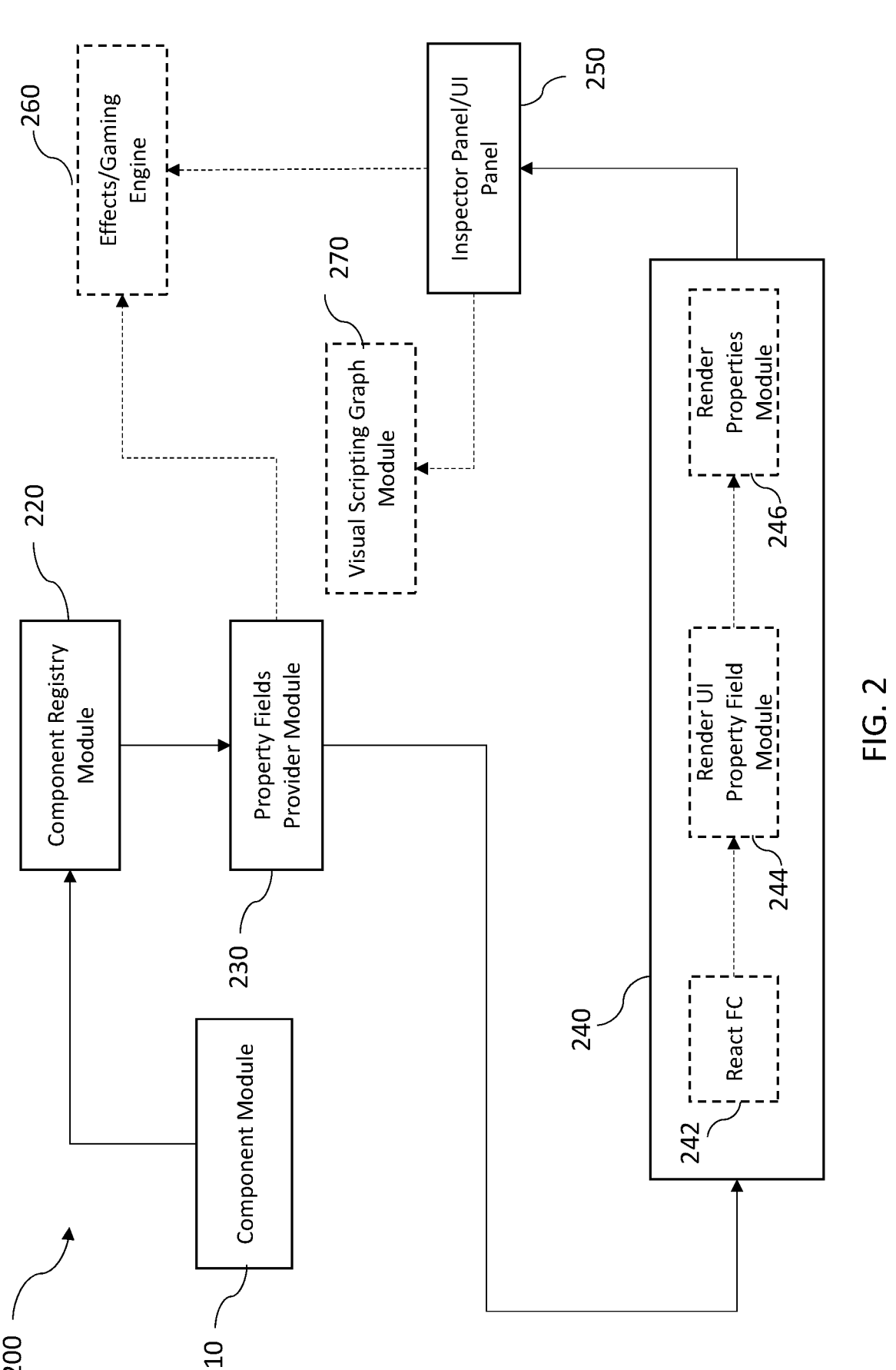
FIG. 2 is a schematic illustration of an example system architecture for automated generation of a user interface and component dissemination.

FIG. 2 is a schematic illustration of an example system architecture 200 for property management and automated generation of a user interface or portion thereof (referred to herein as "user interface") that includes one or more components for one or more entities in an entity component system, in accordance with at least some embodiments described herein. In an embodiment, the system architecture 200 may be a system, such as, Effect House, that is configured to provide an interface between developers and creators and one or more of the social media application, virtual reality application, augmented reality application, and effects or gaming engine. In an example embodiment, the system architecture 200 is configured in a way such that the developer or creator can add, change or remove existing components, and/or configure one or more entities and/or one or more components for creating interactive effects for the entities in the entity component system for use by a user of the social media application, virtual reality application, augmented reality application, or effects or gaming engine. Once the user has made any modifications or changes to the component and/or component properties for the entities on a user interface, e.g., customizing properties of the component(s), the system architecture 200 may be used to generate the entity component system for the virtual reality, augmented reality, and/or gaming environment, e.g., by the server 150 or locally by the terminal device(s). It is to be understood that the system architecture 200 disclosed herein may be a function, an operation, an action, an algorithm, an application, or the like that is implemented, designed, stored, executed, performed, or otherwise hosted in an electronic device (e.g., 600 of FIG. 6, etc.), central processing unit ("CPU"), or other processor-enabled device, which may be a cloud-based network, a local device, or downloaded to the local device, a server, a smartphone, a tablet computer, a laptop computer, a desk computer, (e.g., the terminal device 110, 120, 130, and 140 of FIG. 1, or the server 150 of FIG. 1), and/or any other suitable electronic device. Although illustrated as discrete components, various components may be divided into additional components, combined into fewer components, or eliminated altogether while being contemplated within the scope of the disclosed subject matter. It will be understood by those skilled in the art that each function and/or operation of the components may be implemented, individually and/or collectively, by a wide range of hardware, software, firmware, or any combination thereof.

As illustrated in FIG. 2, the system architecture 200 includes one or more of a component module 210, component registry module 220, property fields provider module 230, rendering module 240, inspector panel/user interface panel 250, an application or effects or gaming engine 260 that receives the updated or new component for one or more entities in the virtual reality, augmented reality, and/or gaming environment, e.g., implementing interactive feature(s) for the one or more entities based on the one or more components in the entity component system, and a visual scripting graph module 270. It is appreciated that by having such system architecture 200, the developer or creator of a new or modified component may not have to or no longer has to write code necessary for the rendering of the user interface, e.g., display and/or controls for interacting with the component, code for storing or retrieving component properties, or code for sending component property updates to the application, effects engine, or gaming engine. Instead, the system architecture 200 is configured to receive the data representation of the component properties, e.g., data objects, e.g., in an array such as a JSON array, register the data objects in the component registry module 220, and render the user interface based on the component properties, in an automated manner, e.g., via translation to property fields using the property fields provider module 230. The system architecture 200 may be further configured to handle the storage, retrieval, and propagation of component property updates to the application, effects engine, or gaming engine, when the data object of the component property is specified to be an engine property. The user interface may as well as attributes for communicating property update events to the application and/or effects or gaming engine, e.g., stored in a LUT or library. For example, in an embodiment, a property field for a data object of a component property that includes "numeric type" may be translated by the system architecture 200, e.g., by the property fields provider module 230, to render a number box for the user interface that may feature input validation and user controls associated with the input, editing, and range checking. In another example embodiment, a property field that includes "3-component vector" may be translated by the system architecture 200, e.g., by the property fields provider module 230, to render the user interface to have three number boxes, one for each component of the vector. An example implementation of the data object, may be entered (or received) as follows:

```
{
    propertyName: 'castShadow',
    type: Boolean,
    uiAttributes: {label: 'meshrenderer_cast_shadow'},
    isEngineProperty: true,
},
{
    propertyName: 'skin',
    type: Boolean,
    uiAttributes: {label: 'meshrenderer_skin', isHiddenCheck: 'isHiddenCheck', isDisabledCheck:
'isDisabledCheck'},
    serializationAttributes: {skip: true},
    isEngineProperty: false,
}
``` then be used to adjust values of the component(s) rendered on the user interface, such that the user of the application, effects engine, or gaming engine may interact with the new component, e.g., an interactive feature, such as, face-stretch, face-mask, cat-face, or the like. As such, by providing data objects as representations of component properties, the system architecture 200 may be able to decouple user interface rendering logic, e.g., code, from each component implementation, such that component properties may be able to be rendered differently in different contexts, thus making the code or logic flexible, easy to modify and maintain, and be able to be reused in many different types of software applications. The details of the system architecture 200 are discussed further below.

The component module 210 may refer to one or more components or modules that are designed, programmed, or otherwise configured to receive one or more data objects for one or more component properties of the one or more components for the user interface. In an embodiment, the one or more data objects may be provided by the developer or creator of the new component or component property using a processor-enabled device, e.g., terminal devices 110, 120, 130, 140, and/or provided on the server, e.g., 150. The one or more data objects may then be received and/or sent by the component module 210 of the system architecture 200. It is understood that the data objects are not code themselves, but rather, objects representing component properties that may be translated, e.g., component processing, by the system architecture to generate the user interface, e.g., property fields for the user interface, in which the property field may represent a user interface control for a data type. In an embodiment, the component properties may be defined as a list of objects such as ComponentProperty-Info objects, in which each component property may correspond to property fields for generating the user interface, In the above embodiment, two properties may be defined for rendering on the user interface, e.g., castShadow and skin. In an embodiment, the "propertyName" may be a data object that is provided for corresponding to the name or label property field on the user interface. The "type" may be a data object that is provided for identifying the type of input that is received. The "uiAttributes" may be a data object that is provided to format and associate the property with the component on the user interface, e.g., component meshrenderer having castShadow and skin as properties. The "serialziationAttributes" may be a data object that is provided to specify whether or not, at runtime, the class can be serialized. The "isEngineProperty" may be a data object that is provided for defining attributes in a property definition that controls behaviors other than for user interface rendering. The data objects for the component properties may further include "default" to provide a default button to reset the component back to a default state or original state, and/or logic components, such as, Getters and Setters for the properties, e.g., getting or setting a class, onCreate or onDependencyUpdate, e.g., for starting or sending data. For example, as indicated above, the data object may include an attribute that defines whether updates to the property should be communicated to the underlying effects or gaming engine (or application). It is understood that while some of the data objects have been identified herein, such disclosure is not intended to be limiting, but rather other data objects may be used for adding, removing, or modifying a user interface and/or property management.

The component registry module 220 may refer to one or more components or modules that are designed, programmed, or otherwise configured to store the data objects for the one or more component properties in storage. In an embodiment, the component registry module 220 may be storage in the form of non-volatile memory in the system architecture, on the terminal device, or server and made accessible, e.g., via network 160, to the processor-enabled device having the application and/or effects or gaming engine. The component registry module 220 may be configured to automatically receive the data objects from the component module 210 by having the data objects include a declarator for declaring, defining, or registering the component properties to the component registry module 220 such that the data objects may be accessible, e.g., broadcast or accessed, by the application, effects engine, or gaming engine, or property fields provider module 230. In an embodiment, the data objects may contain a class decorator, e.g., regComponentProperties, for initiating the registration of the data objects in the component registry module 220, e.g., automatically or manually upon an update. For example, the data objects may be provided and/or stored, e.g., as a JSON array, and may be provided automatically by the component registry module 220. In an embodiment, the storage may be a component registry for storing the data objects, and the storing may include registering the data objects and/or associated component properties in a component registry of the component registry module 220, e.g., registered in a centralized registry. As such, the system architecture 200 may be configured to retrieve component property information as needed, e.g., when rendering the user interface. In other embodiments, the data objects and/or component properties may simply be made available on the component registry module 220, in which the data objects and/or component properties may be accessed or simply made available through an accessor module or function, e.g., by the property fields provider module 230 and/or effects or gaming engine 260. In some embodiments, the system architecture may be configured to automatically send any added data objects and/or updated component properties to the property fields provider module 230 and/or rendering module or framework, e.g., during registration.

The property fields provider module 230 may refer to one or more components or modules that are designed, programmed, or otherwise configured to access the data objects on the storage and determine property fields for the user interface corresponding to the data objects to generate the user interface in an automated manner. The property fields provider module 230 may not only be configured as a translation layer to provide the necessary code to generate or render the user interface, but also to include other functionalities for the system architecture 200, e.g., broadcast or dissemination of new component(s) or modifications of component(s) to the application or effects or gaming engine, input validation checking, undo/redo capabilities, copy/paste functionality, etc. That is, the property fields provider module 230 may be configured to, when executed by the processor, do one or more of the following: handle attributes, handle subGroups, handle rendering conditions, handle property operations, and/or the like. That is, the property fields provider module 230 is configured to obtain the information of the data object and translate the data object information into a property field(s) for the component to render the component on the user interface, for example, an inspector panel having the components and component properties on the user interface, e.g., acts as a translation layer and component processing to provide the necessary script or coding for rendering all or a portion of the user interface. In some embodiments, the property fields provider module 230 is configured to determine the schema of the data objects and include corresponding code to render or generate the user interface from the data objects. For example, the property fields provider module 230 may be configured to determine the data object type, e.g., property, such as, user interface attributes including, but not limited to, portion of the user interface, e.g., inspector panel, labels, property names, type, defaults, buttons, control, etc. and the corresponding code to render or generate the user interface from the data object type, e.g., via a LUT or library, in which the schema may be consistent across any component that is added or modified for the user interface. In some embodiments, the property fields provider module 230 may be configured to determine the schema or rendering conditions of the components and properties on the existing user interface, e.g., from the rendering module 240. As such, since the property fields provider module 230 may be configured to determine and/or receive the schema from the existing user interface, e.g., labels, positioning, formatting, controls, pixel arrangements, etc. of the existing components provided on the user interface, the property fields provider module 230 may be configured to handle rendering conditions for the user interface, e.g., determine the appropriate code to add the component and/or component properties to the user interface, e.g., space adjustments, formatting, pixel placement, re-arrangement of existing components, providing sliders, buttons, or input areas for adjusting or providing values, etc. For example, in an embodiment, the property fields provider module 230 may be configured to translate the one or more data objects into the property fields for rendering or generating the user interface, e.g., coding. As such, the developer or creator of the new component does not need to provide the code to generate or render the user interface, but rather, only provide the necessary data objects corresponding to the component properties.

As such, the property fields provider module 230 is configured to translate the data objects into property field(s) for an automated generation of the component and/or component properties for the user interface simply from the data objects in which the necessary code to manipulate or change the user interface does not need to be provided by the developer or creator. That is, the developer or creator only has to enter the data objects for the component properties and not the code itself to generate the user interface, e.g., the developer or creator does not need to have front end programming knowledge, but rather, the property fields provider module 230 is configured to translate and/or determine from the data object the property fields for rendering the user interface, e.g., from a LUT or library. As such, the property fields provider module 230 is configured to determine the rendering conditions to modify the user interface with the added, removed, and/or modified component, such as, formatting the component, aligning the component, space adjustments, formatting, pixel placement, re-arrangement of existing components, providing sliders, buttons, or input areas for adjusting or providing values, etc., and/or provide for the automatic generation of buttons, and other kinds of default but common functions, such as, creation of context menus, reset buttons for resetting the component properties to a default state, adding of widgets or other behavior modifiers that may be added to the data definition of the component. That is, when the user interface is to be rendered, the property fields provider module 230 may be invoked, such that the property fields provider module 230 may be configured to look for the component(s) to be rendered for the user interface, and determines from the data structure, e.g., data object stored in the component registry module, the component and component properties, and translates all of the component properties into user interface fields that are ready to be rendered, e.g., turn the data objects into code. In some embodiments, the code can be various coding languages, such as, Java, JavaScript, Smalltalk, C++, HTML, Script Resources, TypeScript, combinations thereof, e.g., TypeScript converted to JavaScript, or other coding languages.

The rendering module 240 may refer to one or more components or modules that are designed, programmed, or otherwise configured to generate and/or render the properties to generate the user interface comprising the one or more components, in an automated manner, based on the property fields of the existing one or more components of the user interface, e.g., by invoking the property fields provider module 230. In an embodiment, the rendering module 240 may include a framework or rendering system 242, a render user interface property field module 244, and a render properties module 246. The framework or rendering system 242 may be any user interface rendering system for generating or rendering a user interface, such as, React/React.js Framework, Sync Framework, Lens Studio, or the like. The framework or rendering system 242 may contain libraries for building the user interface based on the components. The user interface may include many layers of components that may be rendered to a root element, e.g., in a data object model. The render user interface property field module 244 may be one or more components or modules that are designed, programmed, or otherwise configured to render the property fields for the user interface, e.g., including, but not limited to, labels, positioning, spacing, alignment, formatting, etc. for the existing components and/or component properties. The render properties module 246 may be one or more components or modules that are designed, programmed, or otherwise configured to render the properties (and/or components) for the user interface. In an embodiment, the render properties modules 246 may be called, e.g., by the property fields provider module 230, whenever the user interface is updated, e.g., when a component is added or modified by the component module 210. While the rendering module 240 is discussed herein as having discrete components, such disclosure is not intended to be limiting. Rather, the rendering module 240 may include more or less systems having the above identified features.

As discussed above, the property fields provider module 230 may provide the property fields and/or rendering properties, e.g., intermediate markup, for generating the user interface, e.g., based on existing format for the user interface. As such, the property fields provider module 230 may be configured to modify the existing user interface to add, remove, or modify the component and/or component properties based on the data objects provided from the component registry module 220, e.g., formatting the component(s), aligning the component(s), space adjustments, formatting, pixel placement, re-arrangement of existing components, etc. Thus, the developer or creator does not need to provide the front-end coding for the component and/or component property to render or generate the user interface, but rather, the property fields provider module 230 is configured to automatically provide the code for the user interface, e.g., the intermediate markup in an automated manner based on the property fields corresponding to the data objects. It is appreciated that while the rendering module 240 is discussed above as generating or rendering the user interface, it is understood that the property fields provider module 230 may be configured to generate the user interface. In other embodiments, the property fields provider module 230 and the rendering module 240 may be a single module having the features of the property fields provider module 230 and the rendering module 240, as discussed above.

The inspector panel/user interface panel 250 may refer to one or more components or modules that are designed, programmed, or otherwise configured to provide an interface for the user with the components and/or component properties provided by the system architecture 200, e.g., the generated user interface based on the property fields corresponding to the one or more data objects. That is, after the user interface, e.g., the inspector panel/user interface panel 250, is rendered and/or generated, the user of the application, effects engine, or gaming engine may be able to change or configure the component, e.g., customize properties of the component(s), for use in the entity component system, e.g., provide interactive effects for use by the user, such as, mesh rendering, collider systems, cat face stretch, etc. In an embodiment, the data objects inputted at the component module 210 may be used to modify the displaying and/or controls provided in the inspector panel. In an embodiment, when the user interacts with the inspector panel/user interface panel 250 and/or the developer or creator adds or modifies a component on the component module 210, the framework or rendering system 242 may be configured to trigger an update to re-render the user interface.

The application or effects/gaming engine 260 may refer to one or more components or modules that are designed, programmed, or otherwise configured to generate the virtual reality, augmented reality, and/or gaming environment based on the components, component properties, and entities in the entity component system, in which the property fields updates on the generated user interface may be communicated to the application or effects/gaming engine 260, e.g., from the property fields provider module 230 and/or the user interface 250 or other component of the system architecture 200. That is, the application or effects/gaming engine 260, when executed by a processor-enabled device, may be configured to generate the game, simulation, or augmentation for the user, in which the entity may represent game objects, such as, players, characters, buildings, or anything else that may be part of the game or simulation. The application or effects/gaming engine 260 may use the components and component properties to modify, define, and/or characterize one or more behaviors of the entity(ies), e.g., an interactive effect that may define or characterize the entity as possessing a particular aspect(s). That is, the application or effects/gaming engine 260 is configured to act on the components of various entities to result in the logic of the game, desired augmentations, or virtual reality generation. It is appreciated that in some embodiments, the application or effects/gaming engine 260 may be configured to obtain or receive the components and/or component properties from the inspector panel/user interface panel 250 to provide the interactive effects for use in the virtual reality, augmented reality, and/or gaming environment. In other embodiments, the application or effects/gaming engine 260 may be configured to obtain the component, component properties, and/or property fields from the property fields provider module 230. That is, property fields provider module 230 may be configured to propagate any component property updates automatically to the application or effects/gaming engine, especially when the data object for the component property is specified as an engine property. In some embodiments, since the behavior of entity(ies) may be changed at runtime by adding, removing, or modifying components, the ambiguity problem of deep and wide inheritance hierarchies often found in Object Oriented Programming techniques may be eliminated.

The virtual scripting graph module 270 may refer to one or more components or modules that are designed, programmed, or otherwise configured to provide visual representation of logic for the system architecture 200. That is, the system architecture 200 may be configured to integrate the component properties that are added or modified on the user interface into a visual scripting graph. This allows for automated integration of complex software features into the component property definitions. As such, such integration may enable the automated generation of context menus for getting and setting the property of the component and property values in the scripting graph, and making nodes available in the scripting graph for use in automating effect features. For example, interactive effect features may be applied for use in the virtual reality, augmented reality, and/or gaming environment based on control logic, e.g., update textures of the user when an event occurs in the virtual reality, augmented reality, and/or gaming environment.

At least in view of the features discussed above, the system architecture 200 may be configured to provide the automated generation of the user interface having one or more components and/or provide property update mechanisms for one or more components, such that the adding of a component, changing or removal of an existing component or entity on the user interface in the system architecture 200 for the entity component system is made easier and less error-prone, e.g., less coding errors and in which no knowledge of front-end development coding is necessary. The system architecture may also be configured to automatically propagate any addition or modification of the component to the application and/or effects or gaming engine, especially when the data object for the component property is specified to be an engine property. At least because the system architecture 200 includes a property fields provider module that is configured to translate the data object into property fields to render the user interface and/or for communicating the components as entered, data object representations of component properties, e.g., attributes, may be used in the system architecture to decouple the user interface rendering logic, e.g., code, from each component implementation. In so doing, the component properties may be able to be rendered differently in different contexts, in which the code may be flexible, easy to modify and maintain, and be able to be reused in many different types of applications, e.g., the user interface rendering code may be saved in the system architecture in a translation layer in the property fields provider module that can be applied for the rendering of the user interface.

That is, the use of the system architecture 200 may include one or more of the following benefits:

1. More rapid development of components. By automating the generation of user interfaces and loading/saving of properties, e.g., at the system framework or architecture level, new component developers or creators only need to specify data describing the component properties, obviating the need for manual definition, placement, and testing of user interface controls. This also eliminates the need for component developers or creators to write the necessary code to manage the loading, saving, and dissemination of component property updates to the application and/or effects or gaming engine. As such, developers and creators of the new component may save time by not having to write the code for the component and be able to quickly create user interfaces for dissemination to users of the application or effects or gaming engine.

2. Simplification of code defining component-related operations. The development of an ECS framework requires the implementation of various functions ancillary to the core capabilities of adding and changing entities and components. Input validation checking, undo/redo capabilities, and copy/paste functionality for components must also be provided by the software and/or system architecture in order to create a pleasant user experience, e.g., the functionalities are provided at the system architecture level instead of at front-end development.

3. Improved code stability. By automating user interface generation and component property management, the system architecture eliminates the bugs that could be introduced into the codebase if the developers or creators need to manually implement such functionality, e.g., avoids coding errors and introduction of low-performing or unstable code.

4. User interface consistency. By automating user interface generation based on the property field definition, e.g., component processing using a translation layer and/or via LUT or library, it is possible to ensure that user interface controls for the same property types are generated in a uniform manner. This leads to consistency of the user interface that may be difficult to achieve if developers or creators are manually developing user interface code for interacting with component properties.

5. Improved control over component rendering performance. With the uniformity afforded by the system architecture 200, component user interface rendering and property handling is done in a single place at the system architecture level, which allows optimization of these functions by improving the performance of the centralized processing. This also prevents component developers from introducing low performing or unstable code, since component processing is handled by the system framework architecture rather than by individual components.

It is appreciated that while the data objects are discussed herein as related to the one or more component properties, such disclosure is not intended to be limiting. Rather, the use of the data objects instead of code may be used to add, remove, or modify various properties, including, but not limited to, adding, removing, or modifying entities or components or systems acting on the components and entities in the entity component system.

Figure 3:
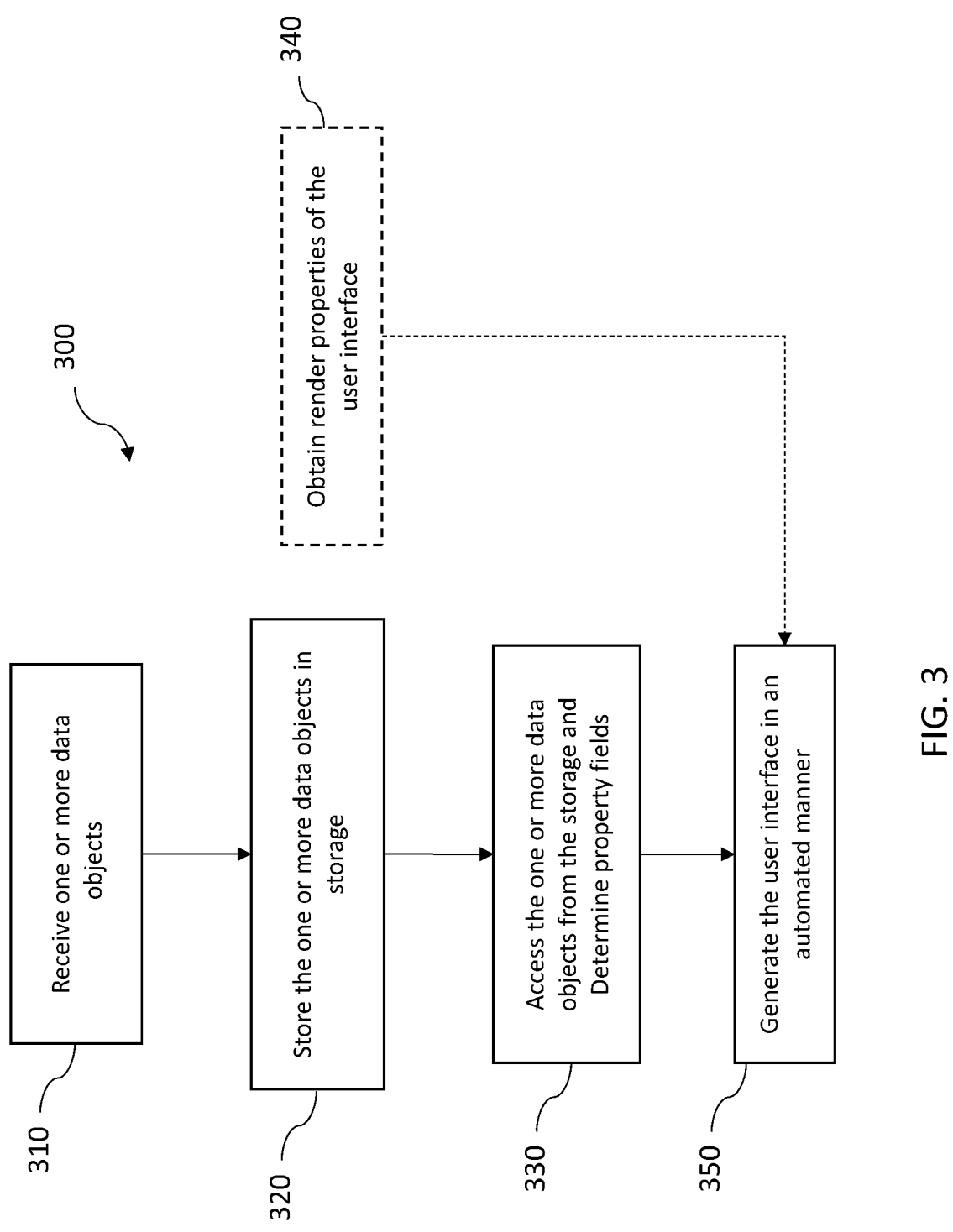
FIG. 3 is a flow chart illustrating an example processing flow for automated generation of a user interface, in accordance with at least some embodiments described herein.

FIG. 3 is a flow chart illustrating an example processing flow 300 for property management and automated generation of a user interface or portion thereof (referred to herein as "user interface") that includes one or more components for one or more entities in an entity component system that may include any of the systems or modules as discussed above, in accordance with at least some embodiments described herein.

Figure 6:
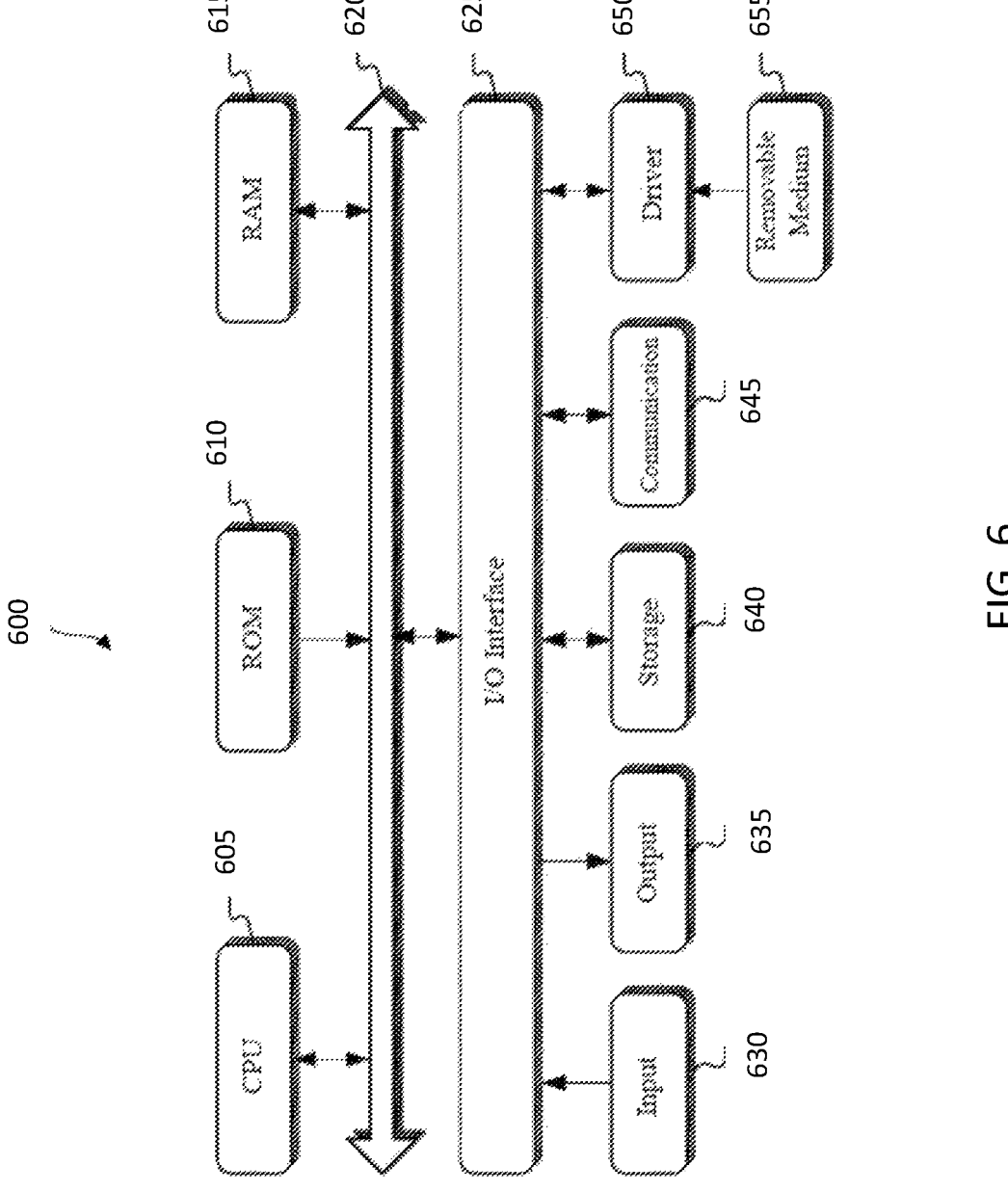
FIG. 6 is a schematic structural diagram of an example computer system applicable to implementing an electronic device, arranged in accordance with at least some embodiments described herein.

It is to be understood that the processing flow 300 disclosed herein can be conducted by one or more processors (e.g., the processor of one or more of the terminal device 110, 120, 130, and 140 of FIG. 1, the processor of the server 150 of FIG. 1, the central processor unit 605 of FIG. 6, and/or any other suitable processor), unless otherwise specified.

It is also to be understood that the processing flow 300 can include one or more operations, actions, or functions as illustrated by one or more of blocks 310, 320, 330, 340, 350. These various operations, functions, or actions may, for example, correspond to software, program code, or program instructions executable by a processor that causes the functions to be performed. Although illustrated as discrete blocks, obvious modifications may be made, e.g., two or more of the blocks may be re-ordered; further blocks may be added; and various blocks may be divided into additional blocks, combined into fewer blocks, or eliminated, depending on the desired implementation. It is to be understood that before the processing flow 300, operations including initializations or the like may be performed. For example, system parameters and/or application parameters may be initialized. Processing flow 300 may begin at block 310.

At block 310 (Receive one or more data objects), the processor of the respective device(s) may be used to provide one or more data objects for one or more component properties for the one or more components for a user interface. In an embodiment, the one or more data objects may be provided by the developer or creator of the new component or component property using a processor-enabled device, e.g., terminal devices 110, 120, 130, 140, and/or provided on the server, e.g., 150. The one or more data objects may then be received and/or sent by a component module of a system architecture. It is understood that the data objects are not code themselves, but rather, objects representing component properties that may be translated, e.g., component processing, by the system architecture to generate the user interface, e.g., into property fields for the user interface, in which the property field may represent a user interface control for a data type, for example, in an inspector panel having the components or another portion of the user interface. In an embodiment, the component properties may be defined as a list of ComponentPropertyInfo objects, in which each component property may correspond to property fields for generating the user interface or portion thereof, as well as attributes for communicating property update events to the application and/or effects or gaming engine, e.g., stored in a LUT or library. For example, in an embodiment, a property field for a data object of a component property that includes "numeric type" may be translated by the system architecture, e.g., by a property fields provider module, to render a number box for the user interface that may feature input validation and user controls associated with the input, editing, and range checking. In another example embodiment, a property field that includes "3-component vector" may be translated by the system architecture, e.g., by the property fields provider module, to render the user interface to have three number boxes, one for each component of the vector. It is understood that while some of the data objects have been identified herein, such disclosure is not intended to be limiting, but rather other data objects may be used for adding, removing, or modifying a user interface or portion thereof and/or for property management. The processing flow may then proceed to 320.

At block 320 (Store the one or more data objects in storage), the processor enabled device for the system architecture may be configured to store the data objects for the one or more component properties storage, e.g., stored on non-volatile memory in the system architecture, stored locally on the terminal device, or stored on a server that may be accessed by the application and/or effects or gaming engine. The storage may be a component registry that may be configured to automatically receive the data objects from the component module by having the data objects include a declarator for declaring, defining, or registering the component properties to the component registry such that the data objects may be accessible, e.g., broadcast or accessed, by the application, effects engine, or gaming engine, or property fields provider module. In an embodiment, the data objects may contain a class decorator, e.g., regComponentProperties, for initiating the registration of the data objects in the component registry, e.g., automatically or manually upon an update. For example, the data objects may be provided and/or stored, e.g., as a JSON array, and may be provided automatically by the component registry. In an embodiment, the storage may be a component registry for storing the data objects, and the storing may include registering the data objects and/or associated component properties in the component registry, e.g., registered in a centralized registry. As such, the system architecture may be configured to retrieve component property information as needed, e.g., when rendering the user interface. In other embodiments, the data objects and/or component properties may simply be made available on the component registry, in which the data objects and/or component properties may be accessed or simply made available through an accessor function, e.g., by the property fields provider module and/or the application or effects or gaming engine. In some embodiments, the system architecture may be configured to automatically send any added data objects and/or updated component properties to the property fields provider module and/or rendering module or framework, e.g., during registration. The processing flow may then proceed to 330.

At block 330 (Access the one or more data objects from the storage and Determine property fields), the processor executed system architecture may be configured to access the one or more data objects from the storage, e.g., component registry, and determine property fields for the user interface corresponding to the one or more data objects, e.g., using the property fields provider module. The property fields provider module may not only be configured as a translation layer to provide the necessary code to generate or render the user interface, but also to include other functionalities for the processing flow. That is, the property fields provider module may be configured to, when executed by the processor, do one or more of the following: handle attributes, handle subGroups, handle rendering conditions, handle property operations, and/or the like. That is, the property fields provider module is configured to obtain the information of the data object and translate the data object information into a property field(s) for the component to render the component on the user interface, for example, an inspector panel having the components and component properties on the user interface, e.g., acts as a translation layer for component processing to provide the necessary script or coding for rendering all or a portion of the user interface. In some embodiments, the property fields provider module is configured to determine the schema of the data objects and include corresponding code to render or generate the user interface from the data objects. For example, the property fields provider module may be configured to determine the data object type, e.g., property, such as, user interface attributes including, but not limited to, portion of the user interface, e.g., inspector panel, labels, property names, type, defaults, buttons, control, etc. and the corresponding code to render or generate the user interface from the data object type, e.g., via a LUT or library, in which the schema may be consistent across any component that is added or modified for the user interface. In some embodiments, the property fields provider module may be configured to determine the schema of the components and properties on the existing user interface, e.g., from the rendering module. As such, since the property fields provider module may determine and/or receive the schema from the existing user interface, e.g., labels, positioning, formatting, controls, pixel arrangements, etc. of the existing components provided on the user interface, the property fields provider module may be configured to determine the appropriate code to add the component and/or component properties to the user interface, e.g., space adjustments, formatting, pixel placement, re-arrangement of existing components, providing sliders, buttons, or input areas for adjusting or providing values, etc. For example, in an embodiment, the property fields provider module may be configured to translate the one or more data objects into the property fields for rendering or generating the user interface, e.g., coding. As such, the developer or creator of the new component does not need to provide the code to generate or render the user interface, but rather, only provide the necessary data objects corresponding to the component properties.

As such, the property fields provider module is configured to translate the data objects into property field(s) for an automated generation of the component and/or component properties for all of or a portion of the user interface simply from the data objects in which the necessary code to manipulate or change the user interface does not need to be provided by the developer or creator. That is, the developer or creator only has to enter the data objects for the component properties and not the code itself to generate the user interface, e.g., the developer or creator does not need to have front end programming knowledge, but rather, the property fields provider module is configured to translate and/or determine from the data object the property fields for rendering the user interface, e.g., from a LUT or library. As such, the property fields provider module is configured to determine the rendering conditions to modify the user interface with the added, removed, and/or modified component, such as, formatting the component, aligning the component, space adjustments, formatting, pixel placement, re-arrangement of existing components, providing sliders, buttons, or input areas for adjusting or providing values, etc., and/or provide for the automatic generation of buttons, and other kinds of default but common functions, such as, creation of context menus, reset buttons for resetting the component properties to a default state, adding of widgets or other behavior modifiers that may be added to the data definition of the component. That is, when the user interface is to be rendered, the property fields provider module may be invoked, such that the property fields provider module may be configured to look for the component(s) to be rendered for the user interface, and determine from the data structure, e.g., data object(s) stored in the component registry module, the component and component properties, and translates all of or portions of the component properties into user interface fields that are ready to be rendered, e.g., turn the data objects into code. In some embodiments, the code can be various coding languages, such as, Java, JavaScript, Smalltalk, C++, HTML, Script Resources, TypeScript, combinations thereof, e.g., TypeScript converted to JavaScript, or other coding languages. The processing flow may then proceed to 340.

At block 340 (Obtain render properties of the user interface), the processor executed system architecture may be optionally configured to generate and/or render the properties to generate the user interface comprising the one or more components, in an automated manner, based on the property fields of the existing one or more components of the user interface. In an embodiment, the obtaining render properties may include rendering the property fields and/or properties (or components) for the user interface, e.g., including, but not limited to, labels, positioning, spacing, alignment, formatting, etc. for the existing components and/or component properties. In an embodiment, the render properties may be called to generate the user interface whenever the user interface is updated, e.g., when a component is added or modified.

At block 350, (Generate the user interface in an automated manner), the processor executed system architecture may be configured to generate the user interface comprising the one or more components, in an automated manner, based on the property fields corresponding to the one or more data objects. That is, after the property fields provider module obtains the information of the data object and translates the data object information into a property field(s) for the component to render the component on the user interface, for example, an inspector panel having the components and component properties on the user interface, and obtains the render properties of the existing user interface, the user interface or portion thereof may be generated or rendered. In an embodiment, a rendering module having a framework or rendering system, a render user interface property field module, and a render properties module may be configured to generate or render the user interface by receiving the property field(s) information for the component from the property fields provider module. That is, after the property fields provider module provides the translation of the data objects, e.g., into property fields or other functionalities, the user interface may be generated and other functionalities performed, e.g., broadcast or dissemination of new component(s) or modifications of component(s) to the application or effects or gaming engine, input validation checking, undo/redo capabilities, copy/paste functionality etc.

As such, the processing flow 300 may provide for the automated generation of the user interface having one or more components and/or provide property update mechanisms for one or more components, such that the adding of a component, changing or removal of an existing component or entity on the user interface in the system architecture for the entity component system is made easier and less error-prone, e.g., less coding errors, and in which no knowledge of front-end development coding is necessary. The processing flow 300 may also be configured to automatically propagate any addition or modification of the component to the application and/or effects or gaming engine, especially when the data object for the component property is specified to be an engine property. At least because the processing flow 300 uses a property fields provider module that is configured to translate the data object into property fields to render the user interface and/or for communicating the components as entered, data object representations of component properties, e.g., attributes, may be used to decouple the user interface rendering logic, e.g., code, from each component implementation. In so doing, the component properties may be able to be rendered differently in different contexts, in which the code may be flexible, easy to modify and maintain, and be able to be reused in many different types of applications, e.g., the user interface rendering code may be saved in the system architecture in a translation layer in the property fields provider module that can be applied for the rendering of the user interface. In so doing, developers and creators of the new component may save time by not having to write the code for the component and be able to quickly create user interfaces for dissemination to users of the application or effects or gaming engine.

That is, the use of the processing flow 300 may include one or more of the following benefits:

1. More rapid development of components. By automating the generation of user interfaces and loading/saving of properties, e.g., at the system framework or architecture level, new component developers or creators only need to specify data describing the component properties, obviating the need for manual definition, placement, and testing of user interface controls. This also eliminates the need for component developers or creators to write the necessary code to manage the loading, saving, and dissemination of component property updates to the application and/or effects or gaming engine. As such, developers and creators of the new component may save time by not having to write the code for the component and be able to quickly create user interfaces for dissemination to users of the application or effects or gaming engine.

2. Simplification of code defining component-related operations. The development of an ECS framework requires the implementation of various functions ancillary to the core capabilities of adding and changing entities and components. Input validation checking, undo/redo capabilities, and copy/paste functionality for components must also be provided by the software and/or system architecture in order to create a pleasant user experience, e.g., the functionalities are provided at the system architecture level instead of at front-end development.

3. Improved code stability. By automating user interface generation and component property management, the processing flow eliminates the bugs that could be introduced into the codebase if the developers or creators need to manually implement such functionality, e.g., avoids coding errors and introduction of low-performing or unstable code.

4. User interface consistency. By automating user interface generation based on the property field definition, e.g., component processing using a translation layer and/or via LUT or library, it is possible to ensure that user interface controls for the same property types are generated in a uniform manner. This leads to consistency of the user interface that may be difficult to achieve if developers or creators are manually developing user interface code for interacting with component properties.

5. Improved control over component rendering performance. With the uniformity afforded by the processing flow 300, component user interface rendering and property handling is done in a single place at the system architecture level, which allows optimization of these functions by improving the performance of the centralized processing. This also prevents component developers from introducing low performing or unstable code, since component processing is handled by the system framework architecture rather than by individual components.

Figure 4:
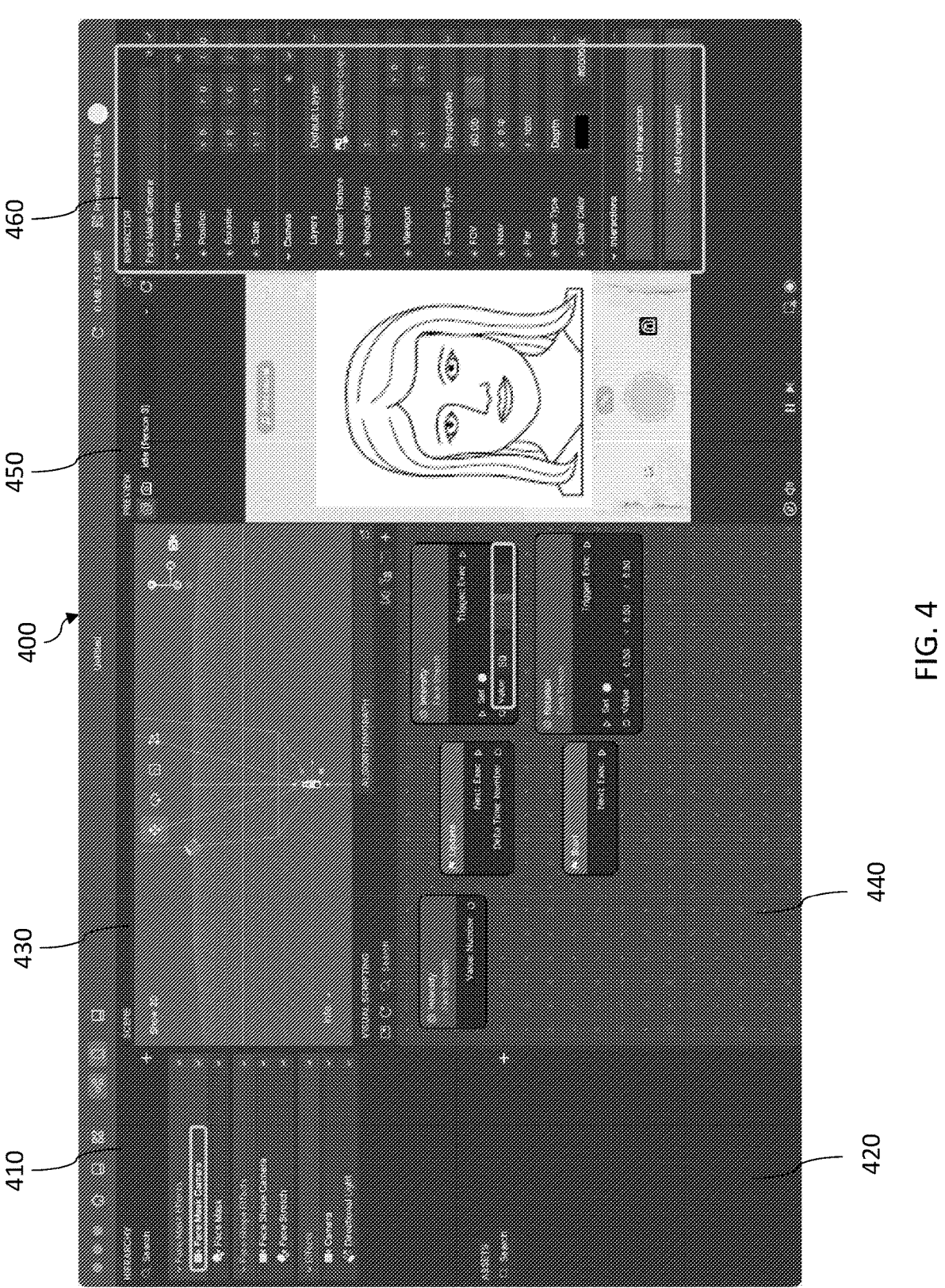
FIG. 4 is an example of a user interface generated by a system architecture or processing flow for automated generation of the user interface, in accordance with at least some embodiment described herein.

FIG. 4 is an example embodiment of a user interface 400 generated by the processing flow 300 of FIG. 3 and/or the system architecture 200 of FIG. 2, as discussed above. In an embodiment, the user interface 400 may be the interface generated by the system architecture. e.g., 200, such as Effect House. As such, the user interface 400 may be configured as the interface between the developers and creators and one or more of the social media application, virtual reality application, augmented reality application, and effects or gaming engine. For example, the system architecture may be configured in a way such that the developer or creator can add, change or remove existing components, and/or configure one or more entities and/or one or more components for creating effects for the entities, such that the user of the application or effects or gaming engine may be able to use the interactive effect of the component created by the developer or creator.

The user interface 400 includes a hierarchy panel 410, an assets panel 420, a scene panel 430, visual scripting panel 440, a preview panel 450, and an inspector panel 460. The hierarchy panel 410 may be configured to display the components and component properties, e.g., effects, that have been added to the system architecture, e.g., built-in objects or projects. The assets panel 420 may be configured to access original or pre-made assets, for example, Textures, 3D, 2D, Materials, Face Effects, Filters, Screen Effects, audio etc. that may be stored in an assets library, for importation to the user interface 400, e.g., that may be needed to build an effect. The scene panel 430 may be configured to show a 3D or 2D view of all the objects added to an effect, and control the view thereof. The visual scripting panel 440 may be configured to allow visual block scripting through nodes, in which the nodes may be linked together with connectors to create paths of logic, e.g., similar to text scripting, like JavaScript or C++. The preview panel 450 may be configured to allow the developer or creator to see how the effect may look when used in the application or by the effects or gaming engine, e.g., on a selected preview video or image. The inspector panel 460 may be configured to view and edit components and properties for changing or modifying the effect.

While the system architecture and processing flow will be discussed with respect to generating the inspector panel 460 of the user interface 400, it is understood that such disclosure is not intended to be limiting. Rather, it is understood that the system architecture and processing flow may also be used to modify or add components of other portions of the user interface 400 as well.

Referring back to FIG. 4, the inspector panel 460 includes one or more components and/or properties, such as, Face Mask Camera, Face Mask, Face Shape Camera, Face Stretch, camera, Directional Light, etc., and properties, such as, transform, layers, render texture, render order, viewport, camera type, Field of View (FOV), near, far, clear type, clear color, interactions, etc. As such, a user (or developer or creator) can modify the values of the properties and components by using one or more of: inputting Boolean or Boolean operators, values for three-dimensional coordinate selection, selecting properties via a drop-down menu, sliding via slider, color selection, etc., for providing an interactive effect for use in the application or effects or gaming engine.

As seen in FIG. 4, the inspector panel has a specific format for displaying the components and properties. As such, developing the code for rendering the user interface is tedious, repetitive, and error prone. For example, each time a new component is added to the entity component system, the corresponding user interface must be painstakingly hand-coded anew at the front-end, including, but not limiting to, the position, rotation, scale, font, style, type of control, e.g., slider, Boolean, geometric axes (XYZ), or the like. Moreover, the new components must be communicated to the respective social media application, virtual reality application, augmented reality application, or effects or gaming engines such that the component is available to the user for using the component and/or the entity in the entity component system.

However, by using the system architecture, e.g., 200 of FIG. 2, and/or the processing flow, e.g., 300 of FIG. 3, as discussed above, property management and automated generation of a user interface or portion thereof (referred to herein as "user interface") that includes one or more components for one or more entities in an entity component system may be simplified, e.g., easier and with less errors in the code, when adding (or modifying) new components (or entities) in the entity component system. For example, in an embodiment, component processing may occur at the system architecture or framework level such that a developer or creator, such as, an engineer developing a new component, may not have to write the code itself, for example, the code for the controls for interacting with the components on the user interface, code for storing and retrieving component properties, or code for sending component property updates to the engine. Instead, in an embodiment, the system architecture may be configured to receive pure-data representations, e.g., one or more data objects, of the component properties from the developer or creator and the system architecture may be configured to register the data objects and component properties with a component registry, determine property fields corresponding to the data objects, e.g., component processing and/or translation, and automatically generate the new user interface for a user of the application, effects engine, or gaming engine for interacting with the new component, e.g., interactive effects for the object(s).

FIGS. 5A and 5B illustrate the data objects 510 entered and/or received, for example, in a component module, e.g., 210, and resulting user interface 560 generated from the data objects, e.g., via component processing or translation, by the system architecture, for example, by the property fields provider module, e.g., 230 and/or by the rendering module 240. As seen in FIGS. 5A and 5B, the data objects for the component and component properties may include, but not limited to, the component properties, such as, Which Face, Intensity, Symmetric, and the data type of the component property, e.g., number properties and Boolean properties. Additionally, the data objects may include user interface properties, such as, label, e.g., name, slider, number type, range, accuracy, etc., and functional properties, such as, Lock and designating whether the property is an engine property, e.g., to be disseminated to the application or effects or gaming engine. As such, after the system architecture, e.g., 200, for example, the property fields provider module, e.g., 230, accesses the data objects 510, e.g., from a component registry, and determines property fields for the user interface corresponding to the one or more data objects, the system architecture may be configured to render or generate the user interface 560 with the component and properties as identified by the data objects. In an embodiment, the system architecture may include LUTs or libraries for associating the data objects with the code necessary to generate the component on the user interface with the identified properties and controls, which includes the proper formatting, positioning, labeling, controls, etc. As such, by providing data objects as representations of component properties, the system architecture may be able to decouple user interface rendering logic, e.g., code, from each component implementation, such that component properties may be able to be rendered differently in different contexts, thus making the code or logic flexible, easy to modify and maintain, and be able to be reused in many different types of software applications. Moreover, since the component processing is occurring at the system architecture level and during front-end processing/development, the developer or creator of the new component does not need to provide the code to generate or render the user interface or functional properties thereof, but rather, only provides the necessary data objects corresponding to the component properties. Thus, the system architecture provides a system that allows more rapid development of components, e.g., developers or creators do not need to spend as much time for front-end development/coding, simplification of code defining component-related operations, improved code stability, e.g., consistent code base, improved user interface consistency, e.g. uniform code generation, and improved control over component rendering performance.

In short, the system architecture and processing flow provide the ability to generate very rich user interfaces and experiences with a data-driven approach, making development of new component capabilities into the software easy. Moreover, since the data objects are only data, component developers or creators do need to understand user interface front-end development, or test user interface code, making the resulting component, interactive effect, and/or application more stable, less error-prone, and ensures consistency in the user interface.

FIG. 6 is a schematic structural diagram of an example computer system 600 applicable to implementing an electronic device (for example, the server or one of the terminal devices shown in FIG. 1), arranged in accordance with at least some embodiments described herein. It is to be understood that the computer system shown in FIG. 6 is provided for illustration only instead of limiting the functions and applications of the embodiments described herein.

As depicted, the computer system 600 may include a central processing unit (CPU) 605. The CPU 605 may perform various operations and processing based on programs stored in a read-only memory (ROM) 610 or programs loaded from a storage device 640 to a random-access memory (RAM) 615. The RAM 615 may also store various data and programs required for operations of the system 600. The CPU 605, the ROM 610, and the RAM 615 may be connected to each other via a bus 620. An input/output (I/O) interface 625 may also be connected to the bus 620.

The components connected to the I/O interface 625 may further include an input device 630 including a keyboard, a mouse, a digital pen, a drawing pad, or the like; an output device 635 including a display such as a liquid crystal display (LCD), a speaker, or the like; a storage device 640 including a hard disk or the like; and a communication device 645 including a network interface card such as a LAN card, a modem, or the like. The communication device 645 may perform communication processing via a network such as the Internet, a WAN, a LAN, a LIN, a cloud, etc. In an embodiment, a driver 650 may also be connected to the I/O interface 625. A removable medium 655 such as a magnetic disk, an optical disk, a magneto-optical disk, a semiconductor memory, or the like may be mounted on the driver 650 as desired, such that a computer program read from the removable medium 655 may be installed in the storage device 640.

It is to be understood that the processes described with reference to the flowcharts and/or the processes described in other figures may be implemented as computer software programs or in hardware. The computer program product may include a computer program stored in a computer readable non-volatile medium. The computer program includes program codes for performing the method shown in the flowcharts.

It is to be understood that the disclosed and other solutions, examples, embodiments, modules and the functional operations described in this document can be implemented in digital electronic circuitry, or in computer software, firmware, or hardware, including the structures disclosed in this document and their structural equivalents, or in combinations of one or more of them. The disclosed and other embodiments can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this document can be performed by one or more programmable processors executing one or more computer programs to perform functions by operating on input data and generating output. The processes and logic flows can also be performed by, and apparatus can also be implemented as, special purpose logic circuitry, e.g., a field programmable gate array, an application specific integrated circuit, or the like.

Processors suitable for the execution of a computer program include, by way of example, both general and special purpose microprocessors, and any one or more processors of any kind of digital computer. Generally, a processor will receive instructions and data from a read only memory or a random-access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., erasable programmable read-only memory, electrically erasable programmable read-only memory, and flash memory devices; magnetic disks, e.g., internal hard disks or removable disks; magneto optical disks; and compact disc read-only memory and digital video disc read-only memory disks. The processor and the memory can be supplemented by, or incorporated in, special purpose logic circuitry.

It is to be understood that different features, variations and multiple different embodiments have been shown and described with various details. What has been described in this application at times in terms of specific embodiments is done for illustrative purposes only and without the intent to limit or suggest that what has been conceived is only one particular embodiment or specific embodiments. It is to be understood that this disclosure is not limited to any single specific embodiments or enumerated variations. Many modifications, variations and other embodiments will come to mind of those skilled in the art, and which are intended to be and are in fact covered by both this disclosure. It is indeed intended that the scope of this disclosure should be determined by a proper legal interpretation and construction of the disclosure, including equivalents, as understood by those of skill in the art relying upon the complete disclosure present at the time of filing.

Aspects:

It is appreciated that any one of aspects can be combined with each other.

Aspect 1. A method for automated generation of a user interface comprising one or more components for one or more entities in an entity component system, the method comprising: receiving one or more data objects for one or more component properties of the one or more components for the user interface; storing the one or more data objects for the one or more component properties in storage; accessing the one or more data objects from the storage and determining property fields for the user interface corresponding to the one or more data objects using a property fields provider module; and generating the user interface comprising the one or more components, in an automated manner, based on the property fields corresponding to the one or more data objects.

Aspect 2. The method of Aspect 1, wherein the one or more component properties include interactive features of the one or more entities in the entity component system.

Aspect 3. The method of any of Aspects 1-2, wherein the determining of the property fields for the user interface includes translating the one or more data objects for the one or more components into the property fields for rendering the user interface.

Aspect 4. The method of any of Aspects 1-3, wherein the storage is a component registry, and wherein the storing of the one or more data objects for the one or more component properties includes registering the one or more data objects for the one or more component properties with the component registry.

Aspect 5. The method of any of Aspects 1-3, wherein the storing of the one or more data objects for the one or more component properties includes accessing the one or more data objects for the one or more component properties through an accessor module.

Aspect 6. The method of any of Aspects 1-5, wherein the one or more data objects for the one or more component properties includes one or more attributes for one of the one or more component properties.

Aspect 7. The method of any of Aspects 1-6, wherein the generating of the user interface further includes an automated integration of the one or more component properties as a visual scripting graph such that the one or more component properties are made available as nodes in the visual scripting graph.

Aspect 8. The method of any of Aspects 1-7, wherein the generating of the user interface includes changing one or more of existing components of the user interface.

Aspect 9. The method of any of Aspects 1-8, further comprising creating interactive effects for the one or more entities in the entity component system using the one or more components.

Aspect 10. The method of any of Aspects 1-9, further comprising customizing properties of the one or more components in the user interface.

Aspect 11. A system for automated generation of a user interface having one or more components for one or more entities in an entity component system, the system comprising: a component module configured to receive one or more data objects for one or more component properties of the one or more components of the user interface; a component registry module configured to receive and/or provide the one or more data objects for the one or more component properties; a property fields provider module configured to access the component registry module, determine property fields for the user interface corresponding to the one or more data objects; and a rendering module configured to generate the user interface having the one or more components, in an automated manner, based on the property fields corresponding to the one or more data objects.

Aspect 12. The system of Aspect 11, wherein the component registry module is further configured to register the one or more data objects for the one or more component properties.

Aspect 13. The system of any of Aspects 11-12, wherein the property fields provider module is further configured to translate of the one or more data objects for the one or more components into the property fields for rendering the user interface.

Aspect 14. The system of any of Aspects 11-13, wherein the rendering module is configured to determine rendering conditions for one or more existing components of the user interface.

Aspect 15. The system of Aspect 14, wherein the property fields provider module is further configured to determine rendering conditions for the one or more data objects for the one or more component properties received from the component module with the one or more existing components of the user interface.

Aspect 16. The system of any of Aspects 11-15, further comprising at least one of an effects engine or a gaming engine that is configured to access the one or more component properties from the property fields provider module.

Aspect 17. The system of any of Aspects 11-16, further comprising a visual scripting graph module configured to automatically integrate the one or more component properties of the user interface into a visual scripting graph.

Aspect 18. The system of Aspect 17, wherein the visual scripting graph module is further configured to automatically generate context menus for obtaining and setting property values for the one or more component properties in the visual scripting graph and configured such that nodes corresponding to the one or more component properties are available in the visual scripting graph to automate effects features for the one or more entities.

Aspect 19. The system of any of Aspects 11-18, wherein the one or more component properties include interactive features of the one or more entities in the entity component system.

Aspect 20. The system of any of Aspects 11-19, wherein the one or more data objects are provided for customizing properties of the one or more components in the user interface.

Aspect 21. A non-transitory computer-readable medium having computer-executable instructions stored thereon that, upon execution, cause one or more processors to perform operations comprising:

receiving one or more data objects for one or more component properties of the one or more components for the user interface;

storing the one or more data objects for the one or more component properties in storage;

accessing the one or more data objects from the storage and determining property fields for the user interface corresponding to the one or more data objects using a property fields provider module; and generating the user interface comprising the one or more components, in an automated manner, based on the property fields corresponding to the one or more data objects.

The terminology used in this specification is intended to describe particular embodiments and is not intended to be limiting. The terms "a," "an," and "the" include the plural forms as well, unless clearly indicated otherwise. The terms "comprises" and/or "comprising," when used in this specification, specify the presence of the stated features, integers, steps, operations, elements, and/or components, but do not preclude the presence or addition of one or more other features, integers, steps, operations, elements, and/or components.

With regard to the preceding description, it is to be understood that changes may be made in detail, especially in matters of the construction materials employed and the shape, size, and arrangement of parts without departing from the scope of the present disclosure. This specification and the embodiments described are exemplary only, with the true scope and spirit of the disclosure being indicated by the claims that follow.

What is claimed is:

1. A method for automated generation of a user interface comprising one or more components for one or more entities in an entity component system, the method comprising:

receiving one or more data objects representing one or more component properties of the one or more components for the user interface;

storing the one or more data objects for the one or more component properties in storage, wherein storing of the one or more data objects for the one or more component properties comprises registering the one or more data objects with a component registry using a class decorator included in the one or more data objects;

accessing the one or more data objects from the storage;

determining property fields for the user interface corresponding to the one or more data objects using a property fields provider module, wherein determining the property fields for the user interface comprises:

determining a schema of the one or more data objects, the schema comprising one or more user interface attributes derived from the one or more data objects; and translating the schema into the property fields for rendering the user interface; and generating the user interface comprising the one or more components, in an automated manner, based on the property fields corresponding to the one or more data objects.

2. The method of claim 1, wherein the one or more component properties include interactive features of the one or more entities in the entity component system.

3. The method of claim 1, wherein the storage is the component registry.

4. The method of claim 1, wherein the storing of the one or more data objects for the one or more component properties includes accessing the one or more data objects for the one or more component properties through an accessor module.

5. The method of claim 1, wherein the one or more data objects for the one or more component properties includes one or more attributes for one of the one or more component properties.

6. The method of claim 1, wherein the generating of the user interface further includes an automated integration of the one or more component properties as a visual scripting graph such that the one or more component properties are made available as nodes in the visual scripting graph.

7. The method of claim 1, wherein the generating of the user interface includes changing one or more of existing components of the user interface.

8. The method of claim 1, further comprising creating interactive effects for the one or more entities in the entity component system using the one or more components.

9. The method of claim 1, further comprising customizing properties of the one or more components in the user interface.

10. The method of claim 1, wherein the one or more user interface attributes comprises one or more of inspector panels, labels, property names, types, defaults, buttons, or controls.

11. A system for automated generation of a user interface having one or more components for one or more entities in an entity component system, the system comprising:

a component module configured to receive one or more data objects representing one or more component properties of the one or more components of the user interface;

a component registry module configured to receive and/or provide the one or more data objects for the one or more component properties and to register the one or more data objects with a component registry using a class decorator included in the one or more data objects;

a property fields provider module configured to access the component registry module, and determine property fields for the user interface corresponding to the one or more data objects, wherein determining the property fields for the user interface comprises:

determining a schema of the one or more data objects, the schema comprising one or more user interface attributes derived from the one or more data objects; and translating the schema into the property fields for rendering the user interface; and a rendering module configured to generate the user interface having the one or more components, in an automated manner, based on the property fields corresponding to the one or more data objects.

12. The system of claim 11, wherein the rendering module is configured to determine rendering conditions for one or more existing components of the user interface.

13. The system of claim 12, wherein the property fields provider module is further configured to determine rendering conditions for the one or more data objects for the one or more component properties received from the component module with the one or more existing components of the user interface.

14. The system of claim 11, further comprising at least one of an effects engine or a gaming engine that is configured to access the one or more component properties from the property fields provider module.

15. The system of claim 11, further comprising a visual scripting graph module configured to automatically integrate the one or more component properties of the user interface into a visual scripting graph.

16. The system of claim 15, wherein the visual scripting graph module is further configured to automatically generate context menus for obtaining and setting property values for the one or more component properties in the visual scripting graph and configured such that nodes corresponding to the one or more component properties are available in the visual scripting graph to automate effects features for the one or more entities.

17. The system of claim 11, wherein the one or more component properties include interactive features of the one or more entities in the entity component system.

18. A non-transitory computer-readable medium having computer-executable instructions stored thereon that, upon execution, cause one or more processors to perform operations comprising:

receiving one or more data objects representing one or more component properties of one or more components for a user interface;

storing the one or more data objects for the one or more component properties in storage, wherein storing of the one or more data objects for the one or more component properties comprises registering the one or more data objects with a component registry using a class decorator included in the one or more data objects;

accessing the one or more data objects from the storage;

determining property fields for the user interface corresponding to the one or more data objects using a property fields provider module, wherein determining the property fields for the user interface comprises:

determining a schema of the data objects, the schema comprising one or more user interface attributes derived from the one or more data objects; and translating the schema into the property fields for rendering the user interface; and generating the user interface comprising the one or more components, in an automated manner, based on the property fields corresponding to the one or more data objects.

19. The system of claim 11, wherein the one or more user interface attributes comprises one or more of inspector panels, labels, property names, types, defaults, buttons, or controls.

20. The non-transitory computer-readable medium of claim 18, wherein the one or more user interface attributes comprises one or more of inspector panels, labels, property names, types, defaults, buttons, or controls.

* * * * *